(12) United States Patent
Klees (10) Patent No.: US 7,240,906 B2
(45) Date of Patent: Jul. 10, 2007

(54) HYDRO-PNEUMATIC SUSPENSION SYSTEM

(75) Inventor: Gerard Klees, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 309 days.

(21) Appl. No.: 10/728,040

(22) Filed: Dec. 4, 2003

(65) Prior Publication Data

US 2004/0113377 A1    Jun. 17, 2004

Related U.S. Application Data (60) Provisional application No. 60/430,898, filed on Dec. 4, 2002.

(51) Int. Cl.
*B60G 21/00*    (2006.01)

(52) U.S. Cl. .................... 280/5.502; 280/5.507

(58) Field of Classification Search ............ 280/5.514, 280/5.5, 5.502, 5.504, 5.506, 5.507, 5.512, 280/5.515, 5.519, 6.157, 124.159, 124.161, 280/124.106, 124.107

See application file for complete search history.

(56) References Cited

U.S. PATENT DOCUMENTS

| | | | | |
|---|---|---|---|---|
| 3,068,023 A | * | 12/1962 | Fiala | ........................ 280/5.507 |
| 4,270,771 A | * | 6/1981 | Fujii | ........................ 280/5.514 |
| 4,606,551 A | | 8/1986 | Toti et al. | |
| 4,655,440 A | * | 4/1987 | Eckert | ...................... 267/64.11 |
| 4,752,062 A | | 6/1988 | Domenichini | |
| 5,089,966 A | * | 2/1992 | Fukushima et al. | ........... 701/38 |
| 5,091,679 A | | 2/1992 | Murty et al. | |
| 5,219,152 A | * | 6/1993 | Derrien et al. | ........... 267/64.15 |
| 5,222,759 A | * | 6/1993 | Wanner et al. | ........... 280/5.515 |
| 5,347,457 A | * | 9/1994 | Tanaka et al. | ................ 701/37 |
| 5,447,332 A | | 9/1995 | Heyring | |
| 5,480,188 A | | 1/1996 | Heyring | |
| 5,558,115 A | | 9/1996 | Heyring | |
| 5,562,305 A | * | 10/1996 | Heyring | ................... 280/5.507 |
| 5,566,970 A | | 10/1996 | Lin | |
| 5,601,307 A | | 2/1997 | Heyring et al. | |
| 5,794,966 A | * | 8/1998 | MacLeod | ................. 280/5.507 |
| 5,839,741 A | | 11/1998 | Heyring | |
| 5,899,472 A | | 5/1999 | Burke et al. | |
| 5,915,701 A | | 6/1999 | Heyring | |
| 5,919,240 A | * | 7/1999 | Ney et al. | ...................... 701/37 |
| 6,010,139 A | | 1/2000 | Heyring et al. | |
| 6,196,555 B1 | * | 3/2001 | Gaibler | .................... 280/6.154 |
| 6,202,613 B1 | | 3/2001 | Nagai | |
| 6,217,047 B1 | | 4/2001 | Heyring et al. | |
| 6,270,098 B1 | | 8/2001 | Heyring et al. | |
| 6,296,235 B1 | | 10/2001 | Dalal | |

(Continued)

*Primary Examiner*—Paul N. Dickson
*Assistant Examiner*—Barry Gooden, Jr.
(74) *Attorney, Agent, or Firm*—Ralph E. Smith (57) ABSTRACT

A hydro-pneumatic suspension system for a vehicle includes hydraulic struts selectively interconnected, in on-road and off-road configurations, to obviate the need for conventional shocks and springs. In the on-road configuration, the hydraulic struts are linked cross-vehicle with multiple accumulators in the circuit for increased on-road roll stiffness. In the off-road configuration, the hydraulic struts are self-linked, with fewer accumulators, to maximize flexibility and articulation of the system. The system also includes a hydraulic supply to selectively raise and lower the vehicle for the off-road and on-road configurations, respectively. In a further configuration, the roll stiffness and articulation of the suspension system is configured solely by the selective connection of accumulators to the hydraulic suspension circuit.

11 Claims, 5 Drawing Sheets

U.S. PATENT DOCUMENTS

| | | |
|---|---|---|
| 6,302,417 B1 | 10/2001 | Heyring |
| 6,318,742 B2 | 11/2001 | Franzini |
| 6,338,014 B2 | 1/2002 | Heyring et al. |
| 6,428,024 B1 | 8/2002 | Heyring et al. |
| 6,575,484 B2 * | 6/2003 | Rogala et al. ........ 280/124.158 |
| 6,604,034 B1 * | 8/2003 | Speck et al. .................. 701/37 |
| 6,679,504 B2 * | 1/2004 | Delorenzis et al. ...... 280/5.507 |
| 2002/0125654 A1 * | 9/2002 | Brandenburger ............ 280/5.5 |
| 2003/0015846 A1 * | 1/2003 | Rogala et al. ........... 280/5.514 |

* cited by examiner

HYDRO-PNEUMATIC SUSPENSION SYSTEM

CROSS-REFERENCE TO RELATED APPLICATIONS

This application claims the benefit of U.S. Provisional Application No. 60/430,898, filed Dec. 4, 2002, entitled "Hydro-Pneumatic Suspension System."

STATEMENT REGARDING FEDERALLY SPONSORED RESEARCH

Not applicable.

BACKGROUND OF THE INVENTION

1. Field of the Invention

The invention relates to vehicle suspension systems, and more specifically to hydro-pneumatic suspension systems switchable between on-road and off-road configurations. In another of its aspects, the invention relates to a vehicle suspension system adaptable from a configuration emphasizing vehicle ride and roll stiffness to a configuration emphasizing maximum axle articulation. In another of its aspects, the invention relates to a vehicle suspension system capable of raising and lowering the vehicle height in conjunction with multiple configurations.

2. Description of Related Art

Conventional front suspension systems, such as found in light and medium duty pickup trucks, are typically comprised of steel coil springs, shock absorbers, steel roll stabilizer bar, and a 5-bar linkage, or similar arrangement. The rear suspension is typically comprised of steel multi-leaf springs and shock absorbers, or similar arrangement.

While such suspension configurations have very acceptable on-road performance for conventional light and medium pickup trucks, their off-road mobility is hampered by the relative lack of axle roll or tramp articulation when traversing uneven terrain. The front stabilizer bar stiffness and the rear leaf spring stiffness prevent the axles from achieving full tramp movement from the jounce travel limit to the rebound travel limit alternatively side to side, resulting in loss of ground contact when one wheel is traversing a large obstacle, such as a rock or boulder.

For maximum mobility and control over sand, snow, low friction surfaces, and rugged off-road terrain, it is desirable to maintain ground contact with all four tires at all times. Increasing the front and rear axle tramp compliance increases the ability of the tires to maintain ground contact under off-road conditions. However, increasing axle compliance by reducing the axle tramp stiffness to achieve more favorable off-road axle articulation and mobility is limited by deteriorated ride and handling characteristics when the vehicle is driven at higher speeds on normal road surfaces. Off-road mobility is further inhibited by the reduction in ground clearance which occurs when the vehicle is loaded.

It would be advantageous to develop a vehicle suspension system that exhibits the advantages of increased axle compliance for favorable off-road behavior, yet can be made to exhibit the stiffer suspension characteristics desired for on-road performance. It would be further advantageous to develop such a system that provides additional ground clearance when needed, and on command.

BRIEF SUMMARY OF THE INVENTION

A hydro-pneumatic suspension system includes a right side hydro-pneumatic strut cross-coupled to a left side hydro-pneumatic strut such that an upper chamber of the right side strut is fluidly connected to a lower chamber of the left side strut and an upper chamber of the left side strut is fluidly connected to a lower chamber of the right side strut, and a first accumulator fluidly connected with the upper chamber of the right side strut, a second accumulator selectively fluidly connected with the upper chamber of the right side strut by a spring-rate valve, a hydraulic pump selectively fluidly connected with the right side strut by a ride-height valve and a suspension control system adapted to control the spring-rate valve, hydraulic pump and ride-height valve to set the suspension system in one of an on-road configuration and an off-road configuration.

In a further embodiment, in a vehicle having a hydro-pneumatic suspension system, the suspension system includes a right side hydro-pneumatic strut cross-coupled to a corresponding left side hydro-pneumatic strut such that an upper chamber of the right side strut is fluidly connected to a lower chamber of the left side strut and an upper chamber of the left side strut is fluidly connected to a lower chamber of the right side strut, a cross-flow valve for selectively fluidly connecting the right side strut from the left side strut, an articulation valve for selectively fluidly connecting the upper chamber of the right side strut with the lower chamber of the right side strut, a first accumulator fluidly connected with the upper chamber of the right side strut, a second accumulator selectively fluidly connected with the upper chamber of the right side strut by a spring-rate valve, a hydraulic pump selectively fluidly connected with the right side and left side struts by a ride-height valve and a suspension control system adapted to control the cross-flow valve, articulation valve, spring-rate valve, hydraulic pump and ride-height valve to set the suspension system in one of an on-road configuration and an off-road configuration.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

This application claims the benefit of U.S. Provisional Application No. 60/430,898, filed Dec. 4, 2002, entitled "Hydro-Pneumatic Suspension System," which is incorporated herein in its entirety.

The invention provides a system for allowing full axle articulation and increased ground clearance to enhance off-road mobility, and shifting to a configuration or mode that provides acceptable on-road ride and handling characteristics. In this dual-mode hydro-pneumatic suspension system, hydraulic cylinders or struts replace the conventional coil or leaf suspension springs, stabilizer bar, and shock absorbers; also, a linkage type rear suspension replaces the rear leaf spring. The hydraulic struts consist of a cylinder, piston, rod, and end mountings. The hydraulic struts are connected to a hydraulic accumulator, which includes a gas chamber that provides the elastic spring function: as hydraulic fluid is displaced into and out of the accumulator as a result of the hydraulic strut rod displacement, the gas is compressed or expanded in the accumulator, which results in changes in pressure acting on the piston and rod of the hydraulic strut. A variable orifice is located in the outlet line to the accumulator to provide the damping function. A hydraulic power supply controls fluid into and out of the hydraulic struts and accumulators to affect raising and lowering the vehicle. Hydraulic flow and pump operation is required only when the vehicle height is being adjusted. Fluid is added to each of the hydraulic struts and accumulators to raise the vehicle; fluid is conducted out of the hydraulic struts and accumulators to the reservoir to lower the vehicle. In the configuration described, the hydraulic power supply consists of an electric motor driven pump, reservoir, supply accumulator, control valves, pressure switch, and relief valve. Other hydraulic power sources could be utilized with this concept, such as the vehicle power steering system, or a power supply that is integrated into each hydraulic strut. An electronic control module controls the system electrically based on command height inputs, vehicle speed, and the piston position or height of each hydraulic strut.

Figure 1A:
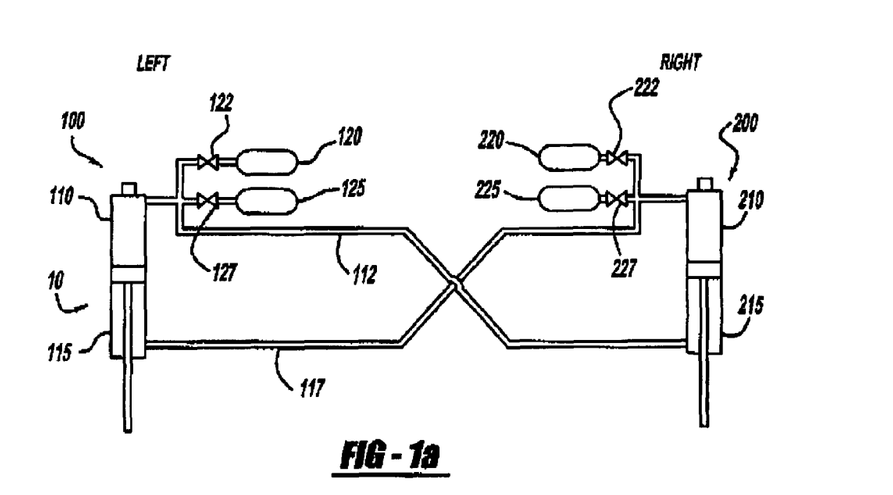
FIG. 1 is a hydraulic circuit schematic of a hydro-pneumatic suspension system in an on-road configuration according to the invention.
Figure 1B:
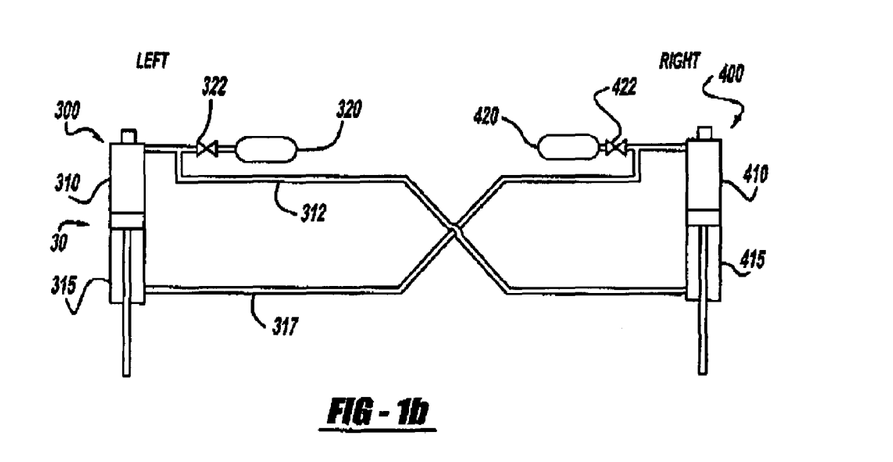
Figure 2A:
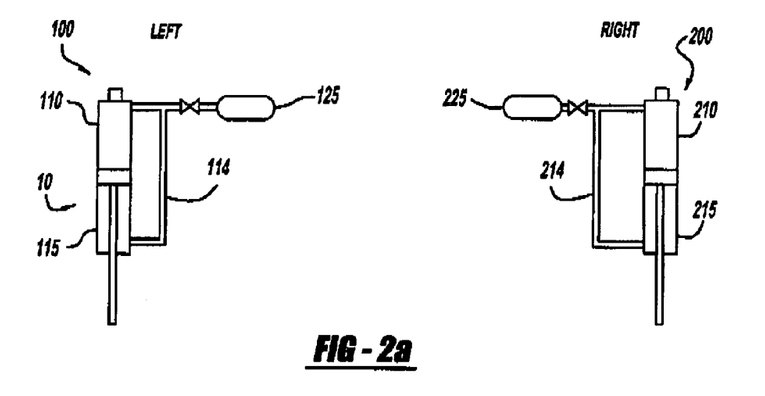
FIG. 2 is a hydraulic circuit schematic of the hydro-pneumatic suspension system of FIG. 1 in an off-road configuration.
Figure 2B:
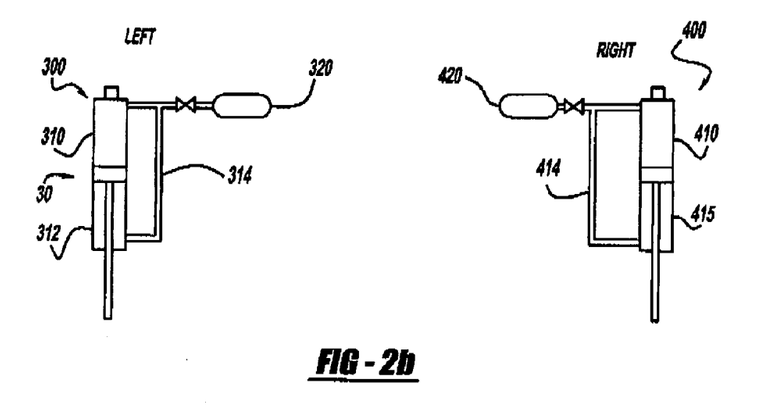
Figure 3:
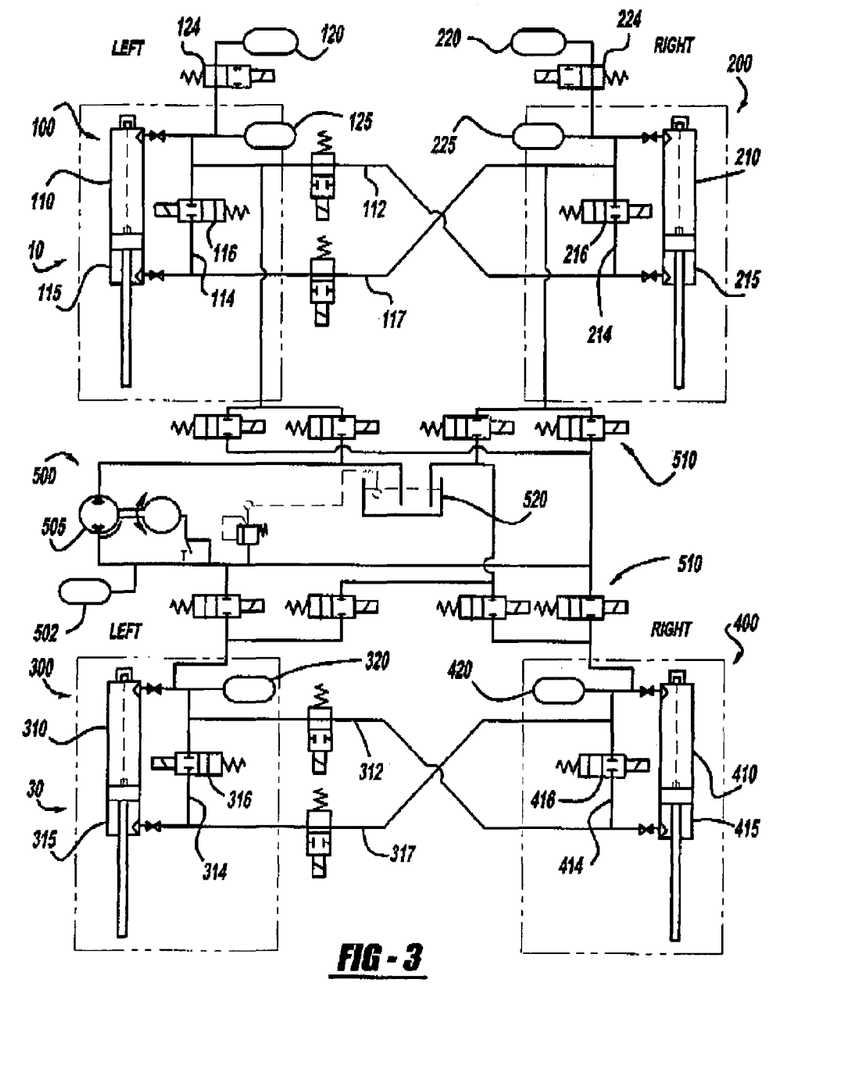
FIG. 3 is a hydraulic system schematic of the hydro-pneumatic suspension system of FIGS. 1–2 in an on-road configuration.

Referring to FIGS. 1–3, the dual-mode hydraulic system consists of two operating modes: on-road and off-road. The on-road mode is configured to provide the desired roll stiffness, ride stiffness, and front to rear roll couple distribution for on-road driving; for the off-road mode, the system is re-configured hydraulically to provide the desired lower front and rear roll (or tramp) stiffness and increased tramp compliance, resulting in greater axle articulation for off-road driving. The hydraulic system illustrated in FIG. 3 is controlled to switch between the on-road and off-road configurations. The on-road configuration is shown in FIG. 3.

A hydraulic circuit configuration for the on-road mode is shown schematically in FIG. 1. To achieve the desired on-road roll stiffness, the hydraulic struts are laterally diagonally interconnected. The top chamber 110 of the left front hydraulic strut 100 is connected to the bottom chamber 215 of the right front strut 200 by hydraulic line 112. Two accumulators 120, 125 are connected to line 112 through damping orifices 122, 127. The top chamber 210 of right front strut 200 is connected to the bottom chamber 115 of left front strut 100 by hydraulic line 117. Two accumulators 220, 225 are connected to line 117 through damping orifices 222, 227.

In the rear of the vehicle, the top chamber 310 of the left rear hydraulic strut 300 is connected to the bottom chamber 415 of the right rear strut 400 by hydraulic line 312. One accumulator 320 is connected to line 312 through damping orifice 322. The top chamber 410 of right rear strut 400 is connected to the bottom chamber 315 of left rear strut 300 by hydraulic line 317. Accumulator 420 is connected to line 317 through damping orifice 422.

The lateral diagonal interconnection between the struts 100, 200 and 300, 400 increases the axle tramp and roll stiffness and allows the ride and roll stiffness to be independently determined based on the ratio of the hydraulic strut piston to rod area. The front and rear piston and rod diameters, together with the accumulator volume and pre-charge pressure are selected to provide the required force to support the vehicle and provide the desired roll stiffness, ride stiffness, and front-to-rear roll couple distribution.

Referring to FIG. 2, the hydraulic system is re-configured for the off-road mode. Each strut top chamber 110, 210, 310, 410 is connected to its respective bottom chamber 115, 215, 315, 415 by a hydraulic line 114, 214, 314, 414. Referring to FIG. 3, this connection is achieved by opening the corresponding solenoid valves 116, 216, 316, 416. The hydraulic lines 112, 117, 312, 317 are disconnected by closing appropriate solenoid valves (shown open in FIG. 3 for the on-road configuration).

For off-road driving, which is limited to relatively low speeds, the vertical ride, and front and rear roll stiffness are reduced such that when any one wheel is raised to its upper jounce limit, all of the other tires maintain ground contact.

In the configuration of FIG. 2, the desired off-road driving characteristics, axle tramp stiffness reduction, or compliance increase, is achieved by closing the hydraulic strut top-to-bottom diagonal connection and connecting the top to the bottom of each hydraulic strut 100, 200, 300, 400. To create a balance in the reduced stiffness, accumulators 120, 220 have been disconnected from front struts 100, 200 by closing solenoid valves 124, 224 (shown open in FIG. 3 for the on-road configuration).

In conjunction with the change from the on-road configuration of FIGS. 1 and 3 to the off-road configuration of FIG. 2, a hydraulic power supply 500 is selectively connected to the front and rear circuits 10, 30 through solenoid valves 510, if a change in vehicle height is indicated. During the change in vehicle height, the appropriate valves 510 open to connect pressure accumulator 502, and push hydraulic fluid into the selected circuit 10, 30. If the pressure in hydraulic supply 500 drops below a predetermined level, pump 505 will activate to return the pressure in the hydraulic supply 500 to the desired level. Conversely, upon indication of a reduction in vehicle height, appropriate solenoid valves 510 are opened to release hydraulic fluid to reservoir 520 of hydraulic supply 500.

Figure 4A:
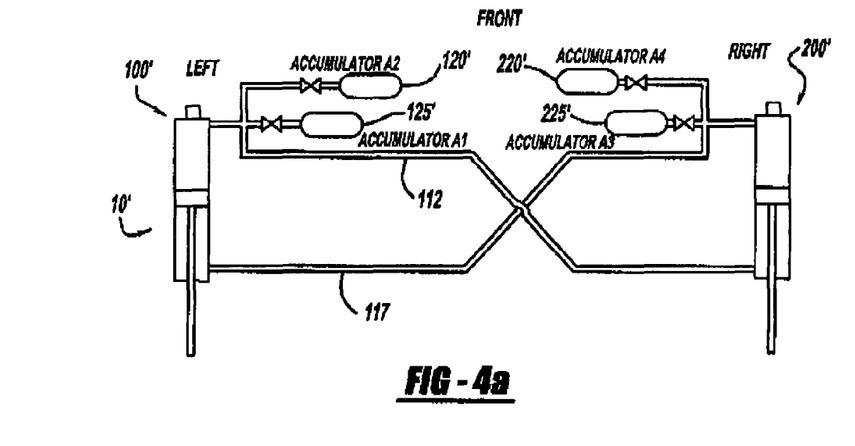
FIG. 4 is a hydraulic circuit schematic of a hydro-pneumatic suspension system in an off-road configuration according to a further embodiment of the invention.
Figure 4B:
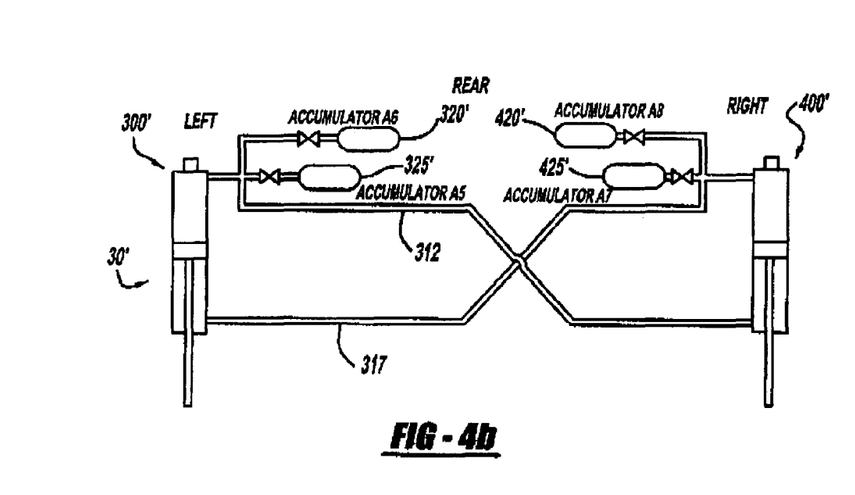
Figure 5:
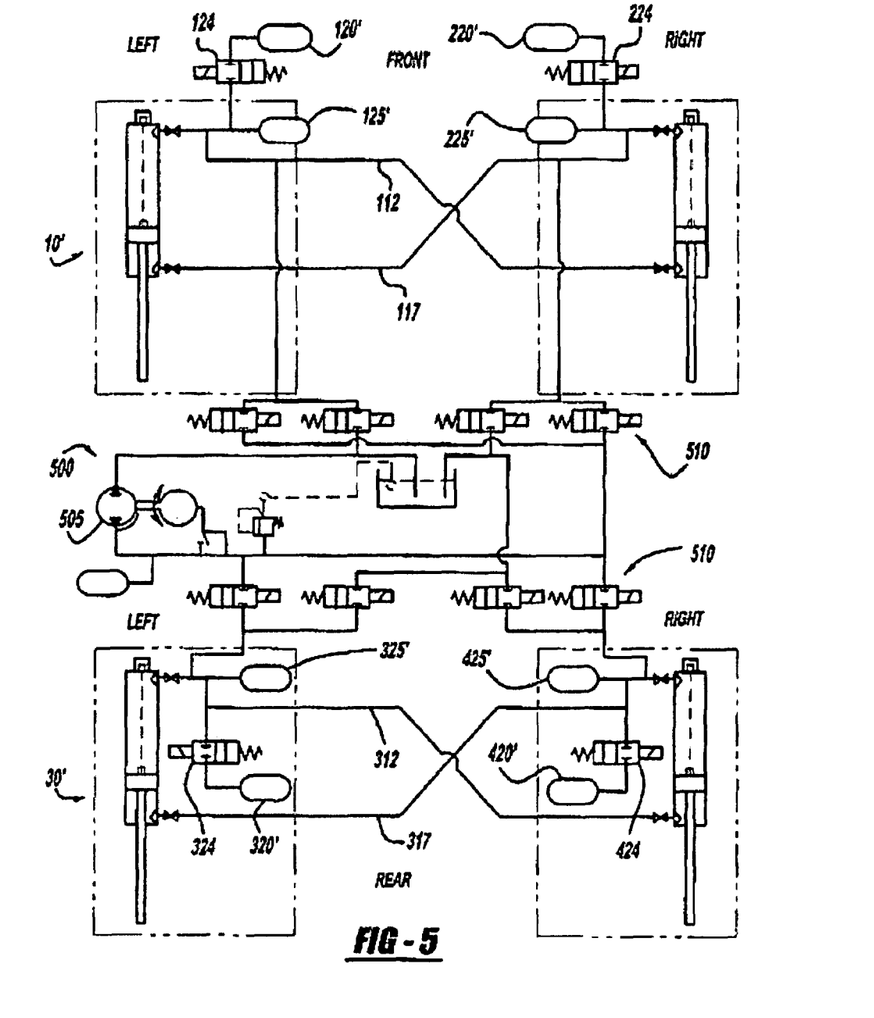
FIG. 5 is a hydraulic system schematic of the hydro-pneumatic suspension system of FIG. 4 in an on-road configuration.

Referring now to FIGS. 4–5, in a further embodiment of the hydro-pneumatic suspension system according to the invention, the diagonal inter-connection between struts 100', 200' and struts 300', 400' is maintained in both the on-road and off-road configurations. The reduction in axle tramp stiffness is achieved by incrementally increasing the accumulator volumes, to affect a decrease in ride, tramp, and roll rates.

In the off-road configuration shown in FIG. 4, left front strut 100' is diagonally interconnected with right front strut 200'. Accumulators 120', 125' are connected to hydraulic line 112. Accumulators 220', 225' are connected to hydraulic line 117. Struts 100', 200' and accumulators 120', 125', 220', 225' have been selected to provide the desired axle tramp stiffness and articulation for off-road performance. The accumulators have been particularly selected in order that, in the on-road configuration, disconnection of the accumulators 120', 220' by closing solenoid valves 124, 224 (as shown in FIG. 5) will provide acceptable roll stiffness for the system. Like consideration must be made for the rear circuit 30', comprising the rear struts 300', 400' connected by hydraulic lines 312, 317, and accumulators 320', 325', 420', 425'. Accumulators 320', 420' are disconnected by closing solenoid valves 324, 424 (see FIG. 5).

In either embodiment described, accumulator volumes can be incrementally added to either the on-road or off-road modes to achieve the desired combination of on-road and off-road suspension characteristics for any vehicle. Further, each of the systems illustrated and described in FIGS. 1–3 and 4–5 can be combined. For instance, front hydraulic circuit 10 of FIGS. 1–3 can be used on the same vehicle as rear circuit 30' of FIGS. 4–5.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A hydro-pneumatic suspension system having a right side hydro-pneumatic strut cross-coupled to a left side hydro-pneumatic strut such that an upper chamber of the right side strut is fluidly connected to a lower chamber of the left side strut and an upper chamber of the left side strut is fluidly connected to a lower chamber of the right side strut, the suspension system further comprising:
   a first accumulator fluidly connected with the upper chamber of the right side strut;
   a second accumulator selectively fluidly connected with the upper chamber of the right side strut by a spring-rate valve;
   a hydraulic supply selectively fluidly connected with the right side strut by a ride-height valve; and
   a suspension control system adapted to control the spring-raze valve, hydraulic pump and ride-height valve to set the suspension system in one of an on-road configuration and an off-road configuration, wherein the suspension control system opens the ride-height valve to fluidly connect the hydraulic supply to the right side strut to raise the overall height of the vehicle, and closes the ride-height valve upon reaching a selected vehicle height.

2. The suspension system of claim 1 wherein the cross-flow valve selectively fluidly connects the upper chamber of the right side strut with the lower chamber of the left side strut, the system further comprising a second cross-flow valve selectively fluidly connecting the upper chamber of the left side strut with the lower chamber of the right side strut.

3. The suspension system of claim 1, further comprising a third accumulator fluidly connected with the upper chamber of the left side strut and a fourth accumulator selectively fluidly connected with the upper chamber of the left side strut by a second spring-rate valve.

4. The suspension system of claim 1, further comprising a flow-restricting orifice fluidly connecting the first and second accumulators with the right side strut, and a second flow-restricting orifice fluidly connecting the third and fourth accumulators with the left side strut.

5. In a vehicle having a hydro-pneumatic suspension system, the suspension system having a right side hydro-pneumatic strut cross-coupled to a corresponding left side hydra-pneumatic strut such that an upper chamber of the right side strut is fluidly connected to a lower chamber of the left side strut and an upper chamber of the left side strut is fluidly connected to a lower chamber of the right side strut, the suspension system further comprising:
   a cross-flow valve for selectively fluidly connecting the right side strut with the left side strut;
   an articulation valve for selectively fluidly connecting the upper chamber of the right side strut with the lower chamber of the right side strut;
   a first accumulator fluidly connected with the upper chamber of the right side strut;
   a second accumulator selectively fluidly connected with the upper chamber of the right side strut by a spring-rate valve;
   a hydraulic simply selectively fluidly connected with the right side and left side struts by a ride-height valve; and
   a suspension control system adapted to control the cross-flow valve, articulation valve, ride-height valve and spring-rate valve to set the suspension system in one of an on-road configuration and an off-road configuration and wherein the suspension control system opens the ride-height valve and fluidly connects the hydraulic supply to raise the overall height of the vehicle.

6. The suspension system of claim 5, wherein the suspension control system further closes the cross-flow valve and the spring-rate valve, and opens the articulation valve to set the suspension system in the off-road configuration.

7. The suspension system of claim 5, wherein the cross-flow valve selectively fluidly connects the upper chamber of the right side strut with the lower chamber of the left side strut, the system further comprising a second cross-flow valve selectively fluidly connecting the upper chamber of the left side strut with the lower chamber of the right side strut.

8. The suspension system of claim 5, further comprising a third accumulator fluidly connected with the upper chamber of the left side strut and a fourth accumulator selectively fluidly connected with the upper chamber of the left side strut by a second spring-rate valve.

9. The suspension system of claim 8, further comprising a flow-restricting orifice fluidly connecting the first and second accumulators with the right side strut, and a second flow-restricting orifice fluidly connecting the third and fourth accumulators with the left side strut.

10. A suspension system comprising:
   a right side hydro-pneumatic strut cross-coupled to a left side hydro-pneumatic strut such that an upper chamber of the right side strut is fluidly connected to a lower chamber of the left side strut and an upper chamber of the left side strut is fluidly connected to a lower chamber of the right side strut;
   a first accumulator fluidly connected with the upper chamber of the right side strut;
   a second accumulator selectively fluidly connected with the upper chamber of the right side strut by a spring-rate valve;
   a hydraulic supply selectively fluidly connected with the right side strut by a ride-height valve; and
   a suspension control system adapted to control the spring-rate valve, hydraulic pump and ride-height valve to set the suspension system in one of an on-road configuration and an off-road configuration;

wherein the suspension control system opens the ride-height valve to connect the hydraulic supply to the right side strut to raise the overall height of the vehicle when converting from the on-road configuration to the off-road configuration.

11. The suspension system of claim 10 further comprising:
 a first cross-flow valve for selectively fluidly connecting the right side strut to the left side strut; and
 a second cross-flow valve for selectively fluidly connecting the left side strut to the right side strut;
 a conduit and an articulation valve for selectively fluidly connecting the upper chamber of the right side strut with the lower chamber of the right side strut;

wherein the suspension control system is arranged to set the suspension system in the off-road configuration by closing the ride-height valve, the first and second cross-flow valves and the spring rate valve, and opening the articulation valve; and wherein the suspension control system is arranged to set the suspension in the on-road configuration by closing the articulation valve and opening the cross-flow valve and the spring-rate valve.

* * * * *